United States Patent
Tanaka et al.

(10) Patent No.: US 7,463,588 B1
(45) Date of Patent: Dec. 9, 2008

(54) MECHANISM FOR ENABLING LOAD BALANCING TO BE ACHIEVED IN A LOOP-FREE SWITCHING PATH, REVERSE PATH LEARNING NETWORK

(75) Inventors: Bert H. Tanaka, Saratoga, CA (US); Daniel J. Maltbie, Santa Cruz, CA (US); Joseph R. Mihelich, Fremont, CA (US)

(73) Assignee: Woven Systems, Inc., Sunnyvale, CA (US)

( * ) Notice: Subject to any disclaimer, the term of this patent is extended or adjusted under 35 U.S.C. 154(b) by 676 days.

(21) Appl. No.: 11/056,436

(22) Filed: Feb. 10, 2005

Related U.S. Application Data

(60) Provisional application No. 60/545,788, filed on Feb. 18, 2004.

(51) Int. Cl.
*H04L 12/28* (2006.01)
*H04L 12/66* (2006.01)

(52) U.S. Cl. .................. 370/238; 370/351; 370/352; 370/356

(58) Field of Classification Search .................. 370/216, 370/230.1, 235, 237, 256, 400, 401, 351, 370/238, 255
See application file for complete search history.

(56) References Cited

U.S. PATENT DOCUMENTS

| | | | | |
|---|---|---|---|---|
| 4,736,363 A | * | 4/1988 | Aubin et al. | 370/400 |
| 5,590,122 A | * | 12/1996 | Sandorfi et al. | 370/394 |
| 5,592,610 A | * | 1/1997 | Chittor | 714/4 |
| 5,805,705 A | * | 9/1998 | Gray et al. | 713/160 |
| 6,052,805 A | * | 4/2000 | Chen et al. | 714/712 |

(Continued)

FOREIGN PATENT DOCUMENTS

EP    1109376 A2  *  6/2001

(Continued)

OTHER PUBLICATIONS

Gusat, M. et al., "Extended Ethernet Congetstion Management (E2CM): Per Path ECM—A Hybrid Proposal", IBM Research GmbH, Zurich, Mar. 14, 2007, 43 pages.

(Continued)

*Primary Examiner*—Edan Orgad
*Assistant Examiner*—Christopher T Wyllie
(74) *Attorney, Agent, or Firm*—Bobby K. Truong; Hickman Palermo Truong & Becker LLP

(57) ABSTRACT

A mechanism is disclosed for enabling load balancing to be achieved in a loop-free switching path, reverse path learning network, such as an Ethernet network. The network is divided into a plurality of virtual networks, with each virtual network providing a different path through the network from a source node to a destination node. When it comes time to send a set of information from the source node to the destination node, one of the plurality of virtual networks, and hence, one of the plurality of paths, is selected. The set of information is then updated to indicate the selected virtual network, and sent into the network to be transported to the destination node along the selected path. With multiple paths, and with the ability to select between the multiple paths, it is possible to balance the load imposed on the multiple paths.

47 Claims, 6 Drawing Sheets

U.S. PATENT DOCUMENTS

| | | | |
|---|---|---|---|
| 6,188,694 B1 * | 2/2001 | Fine et al. | 370/402 |
| 6,256,295 B1 * | 7/2001 | Callon | 370/254 |
| 6,738,352 B1 * | 5/2004 | Yamada et al. | 370/238 |
| 6,781,989 B1 * | 8/2004 | Acharya | 370/392 |
| 6,804,201 B1 * | 10/2004 | Gelenbe | 370/255 |
| 2004/0010618 A1 * | 1/2004 | Thomas | 709/245 |

FOREIGN PATENT DOCUMENTS

| | | | |
|---|---|---|---|
| EP | 1109376 | * | 12/2002 |
| WO | WO 00/13376 | * | 3/2000 |

OTHER PUBLICATIONS

Minkenburg, Cyriel et al., "Source-based E@CM Validation of the Orlando Proposal", IBM Research GmbH, Zurich, Mar. 22, 2007, 10 pages.

Moon, Sue B., Measurement and Analysis of End-To-End Delay and Loss in the Internet, submitted to the Graduate School of the University of Massachusetts Amherst, Feb. 2000, 134 pages.

Liu, Jiuxing et al., "Building Multirail InfiniBand Clusters: MPI-Level Design and Performance Evaluation", Technical Report, Computer Science and Engineering, The Ohio State University, 2004, 13 pages.

McAlpine, Gary, "Congestion Control for Switched Ethernet", Intel Corporation, Jul. 2005, 8 pages.

Coll, Salvador et al., "Using Multirail Networks in High Performance Clusters", CCS-3 Modeling, Algorithms, & Informatics Group, Computer & Computational Sciences Division, Los Alamos National Laboratory, 2001, 27 pages.

Antchev, G. et al., "The CMS event builder demonstrator and results with Ethernet and Myrinet switch technologies," 4 pages.

Becker, Donald, "Beowulf Ethernet Channel Bonding," retrieved from <http://beowulf.es.embnet.org/software/bonding.html>, retrieved on Jul. 19, 2005, 1 page.

Brigljevic, V., "The CMS Event Builder," Computing in High Energy and Nuclear Physics, La Jolla Ca, Mar. 24-28, 2003, pp. 1-12.

IEEE, "IEEE Standards for Local and metropolitan area networks—Virtual Bridged Local Are Networks," IEEE Computer Society, May 7, 2003, table of contents pp. xi-xiii, text pp. 15-154.

Kudho, Tomohiro, Email message to Bert Tanaka in regards to: "VLAN-based multi-path L2 Ethernet network," email dated Feb. 10, 2004, 5 pages.

Kudho, Tomohiro et al., "VLAN-based Routing: Multi-path L2 Ethernet Network for HPC Clusters," Grid Technology Research Center National Institute of Advanced Industrial Science and Technology, Tsukuba Ibaraki, Japan, Cluster 2004 Poster Abstracts, 1 page.

Mellanox Technologies, Inc., "InfiniBand Clustering, Delivering Better Price/Performance than Ethernet," White Paper Rev. 1.00, pp. 1-8.

Meijers, Frans, "The CMS Event Builder and results with Ethernet and Myrinet switch technologies," CMS DAQ group, CHEP 2001, Beijing, China, Sep. 3-7, 2001, pp. 1-35.

Myricom, "Myricom Unites High-Performance Computing and 10-Gigabit Ethernet," retrieved from http://www.myri.com/news/050620a/>, retrieved on Jun. 22, 2005, 3 pages.

Otsuka, Tomohiro et al., "VLAN-based Minimal Paths in PC Cluster with Ethernet on Mesh and Torus," Department of Information and Computer Science, Keio University, Japan, 10 pages.

Sharma, Srikant et al., "Viking: A multi-Spanning-Tree Ethernet Architecture for Metropolitan Area and Cluster Networks," Department of Computer Science, Stony Brook University, Stony Brook, NY, pp. 1-12.

SGI, "SGI Network Load Balancing Software," SGI Datasheet, 2 pages.

* cited by examiner

MECHANISM FOR ENABLING LOAD BALANCING TO BE ACHIEVED IN A LOOP-FREE SWITCHING PATH, REVERSE PATH LEARNING NETWORK

PRIORITY APPLICATION

This application claims the benefit of provisional patent application U.S. Ser. No. 60/545,788, entitled A MECHANISM FOR LOAD BALANCING TRAFFIC IN A LOOP-FREE SWITCHING PATH, REVERSE PATH LEARNING NETWORK, filed on Feb. 18, 2004, the contents of which are incorporated in their entirety herein by this reference.

BACKGROUND

Over the past several years, the computing and storage server industries have been migrating towards a network-based computing and storage model to take advantage of lower cost, high-performance commodity processors and lower cost, high-density storage media. This server industry trend has created a need for a highly scalable interconnect technology to enable the various computing and storage resources to be efficiently and effectively coupled. One type of interconnect that has been considered for this purpose is an Ethernet network.

An Ethernet network is a loop-free switching path, reverse path learning network. By "loop-free", it is meant that there is only one path between any pair of nodes in the network. Because of this loop-free property, it is possible for the switches in an Ethernet network to forward packets by broadcast flooding, and to populate their forwarding tables through reverse path learning.

Specifically, when an Ethernet switch encounters a packet with a destination node address that it does not have in its forwarding tables, the switch broadcasts that packet on all outgoing links, except for the link on which the packet was received. All subsequent switches that receive the packet that do not have the destination node address in their forwarding tables do the same thing. Eventually, the packet will be delivered to the destination node. Because there is only one path to the destination node, it is assured that broadcasting the packet in this way will not create an infinite loop of broadcasts.

In addition to broadcasting the packet, a switch also determines, from the packet, the address of the source node that sent the packet. It also notes the link on which the packet was received. This address and link association is stored in the forwarding tables of the switch. In the future, if the switch receives any packet destined for the source node, it will know, based upon the address and link association in the forwarding tables, which link to switch the packet to. It will not need to broadcast the packet. In this way, an Ethernet switch learns the reverse path of a packet. Because of this reverse path learning capability, it is not necessary to pre-configure the forwarding tables of Ethernet switches. The switches can build these forwarding tables on the fly. This self learning capability of Ethernet switches is a key "plug and play" attribute of an Ethernet network, and is one of the reasons why Ethernet is so widely deployed.

While the loop-free aspect of an Ethernet network gives rise to certain advantages, it also is the root of several significant drawbacks. First, because there is only one path between each pair of nodes, the network does not recover from failure as quickly as would be desired. When a link in a path is disabled, another path has to be determined and deployed. This takes a relatively long time, and during that time, nodes coupled via that link cannot communicate. Another drawback is that the single path between each pair of nodes limits the cross section bandwidth of the network; thus, the switching capacity of the network is underutilized. Furthermore, because there is only one path between each pair of nodes, it is not possible to spread and balance the traffic across a plurality of paths. For these and other reasons, Ethernet, as it has been implemented, has not been an effective interconnect for coupling computing and storage resources in a network-based, high-performance system.

SUMMARY

In accordance with one embodiment of the present invention, there is provided a mechanism that enables load balancing to be achieved in a loop free switching path, reverse path learning network, such as an Ethernet network.

As noted previously, in a typical Ethernet network, there is only one path between any pair of nodes. Because there is only one path, it is not possible to balance the traffic load between a pair of nodes across a plurality of paths. To enable load balancing, multiple paths need to be provided. In one embodiment, multiple paths are provided by way of virtual networks. More specifically, the network is divided into a plurality of virtual networks, and each virtual network provides a different path through the network from a source node to a destination node. The virtual networks are implemented in such a way that the switches in the network may still broadcast packets without causing infinite broadcast loops, and may still perform reverse path learning. Thus, despite the fact that there are multiple possible paths between a source node and a destination node, the overall network is still a loop-free switching path, reverse path learning network. Because it remains this type of network, it retains all of the associated advantages, including the "plug and play" capability mentioned above.

In such a system, a set of information may be sent from a source node to a destination node as follows. Initially, a network interface that interfaces the source node to the network acquires from the source node a set of information that is destined for the destination node. The set of information specifies an address for the destination node or comprises information from which the address can be derived. The network interface determines a set of virtual networks that can be used to transport the set of information from the source node to the destination node. The network interface then selects a particular virtual network from the set of virtual networks. In one embodiment, this selection is done after the address of the destination node is specified or derived. Because each virtual network provides a different path through the network from the source node to the destination node, selecting a particular virtual network, in effect, selects a particular path. In one embodiment, the selection of the particular virtual network, and hence, the particular path is done in such a manner as to balance the traffic load across the multiple paths. For example, the particular virtual network may be selected in a random manner or in a round-robin fashion. It may also be selected based upon current traffic conditions (e.g. which path is currently the least loaded, which path currently has the most capacity for carrying traffic, etc.).

After the particular virtual network is selected, the network interface updates the set of information to include information indicating the particular virtual network that has been selected. The network interface then sends the updated set of information into the network to allow the network to transport the updated set of information to the destination node along the particular path. In this manner, the set of information is sent to the destination node along one of multiple paths. In one embodiment, the network interface processes every set of information sent from the source node to the destination node in this way. Thus, load balancing can be performed on a dynamic, packet by packet basis, in a loop-free switching path, reverse path learning network.

DETAILED DESCRIPTION OF EMBODIMENT(S)

One embodiment of the present invention is implemented in a loop-free switching path, reverse path learning network, such as an Ethernet network. Before describing this embodiment in detail, some additional information on Ethernet networks will be provided to facilitate a complete understanding of the invention.

Ethernet Networks

Figure 1:
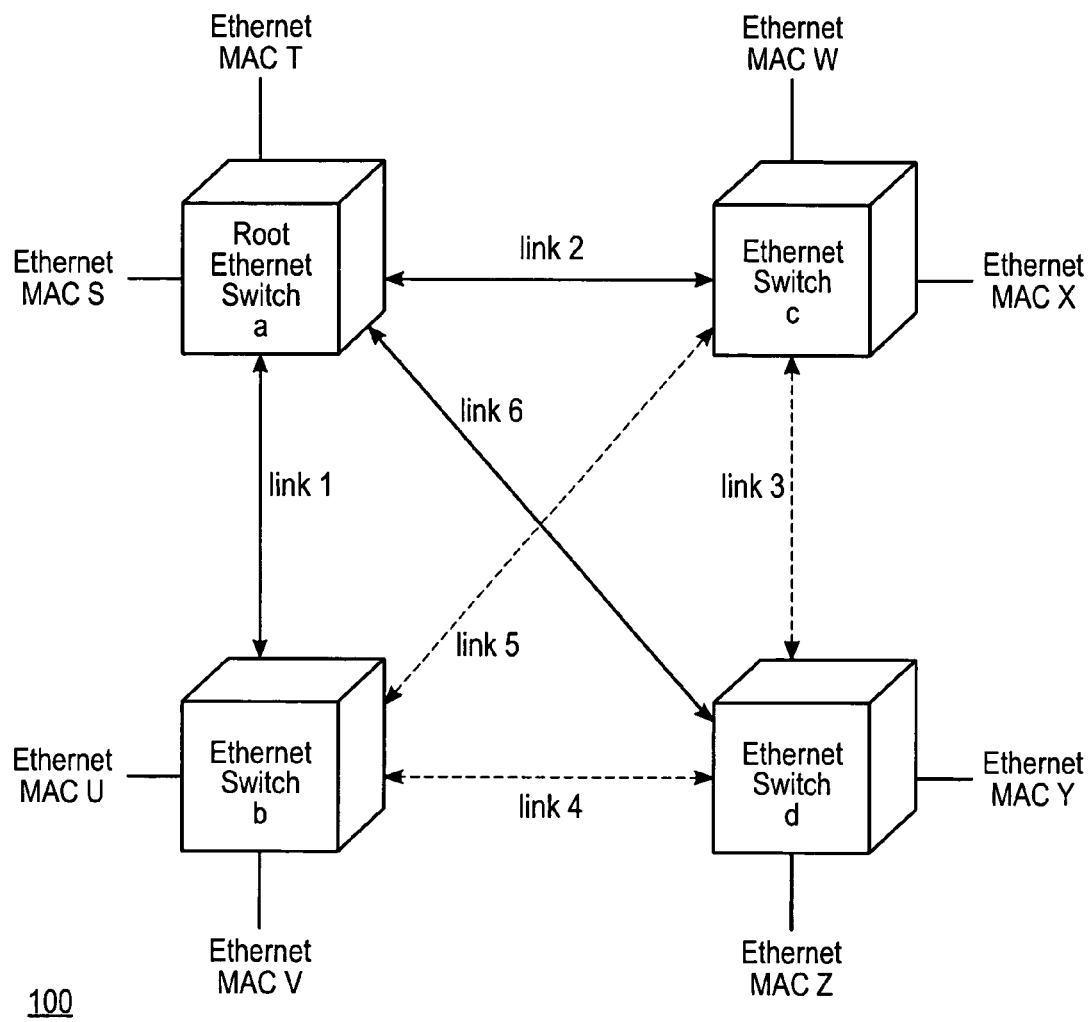
FIG. 1 shows a sample Ethernet network.

FIG. 1 shows a sample Ethernet network. As shown, the network 100 comprises four Ethernet switches a, b, c, and d. The switches are connected to each other by links 1 through 6. Coupled to each switch are two end nodes, identified by their Ethernet MAC (media access control) addresses. Specifically, switch a is coupled to the nodes with MAC addresses S and T. Switch b is coupled to the nodes with MAC addresses U and V. Switch c is coupled to the nodes with MAC addresses W and X, and switch d is coupled to the nodes with MAC addresses Y and Z.

In an Ethernet network, the path between each pair of nodes is determined using a spanning tree protocol (STP). The STP ensures that there is no more than one path between each pair of nodes so that the network 100 is "loop-free". If an STP is applied to the network 100 of FIG. 1 with switch a being designated as the root switch, then the link configuration shown in FIG. 1 may result, where links 1, 2, and 6 (shown in solid lines) are put into a forwarding state, and links 3, 4, and 5 (shown in dashed lines) are blocked. Because links 3, 4, and 5 are blocked, they cannot be used to carry traffic; thus, for example, switch c cannot send any information to switch d using link 3. Blocking some of the links in this manner enforces the requirement that there be one and only one path between each pair of nodes. The resulting tree structure composed of links 1, 2, and 6 allows all switches to forward packets to each other without encountering a forwarding loop.

Suppose now that one of the nodes (say the one with MAC address Z) wants to send an Ethernet packet to the node with MAC address U. To do so, it first sends the packet to switch d. Switch d looks into its forwarding table, and if it does not find MAC address U, it broadcasts the packet to its outgoing ports, in this case the port to link 6 and the port connected to the node with MAC address Y. Ethernet packets that arrive at nodes for which the MAC address does not match will be dropped; thus, the node with MAC address Y will drop the packet. Switch a then receives the packet and looks into its forwarding table for MAC address U. If it does not find MAC address U, it broadcasts the packet to its outgoing links, in this case links 1 and 2, and to both of its connected nodes. When the packet arrives at switch b, switch b looks into its forwarding table, and if it does not find MAC address U in the forwarding table, it broadcasts the packet to its outgoing links, in this case to the nodes with MAC address U and MAC address V. The node with MAC address U thus receives the packet. In this way, the node with MAC address Z is able to send an Ethernet packet to the node with MAC address U without the nodes or the intermediate switches knowing the forwarding path beforehand.

This broadcast or flooding mechanism, while effective, can cause unnecessary traffic over the switching links. Ethernet solves this problem by using reverse path learning to create a forwarding table association between MAC addresses and ports. In reverse path learning, the switches look at the source MAC address of the Ethernet packets that they receive, and populate their forwarding tables with the MAC address/received port associations. In the above example, when the node with MAC address U later sends a packet to the node with MAC address Z, all of the switches in the path (switch b, switch a and switch d) will have "learned" the association of the MAC address Z with the respective received port from the previous received Ethernet packet. Therefore, switch b will know to forward Ethernet packets with MAC address Z as the destination address on link 1 since that was the link on which it received Ethernet packets with MAC address Z as the source MAC address. Likewise, switch a will know to switch such packets to link 6. Similarly, switch d will know to forward such packets to the port connected to the node with MAC address Z. In this way, the network self-learns the reverse paths so that broadcast and flooding is performed in very few instances. The key ingredient to making reverse path learning possible is the fact that there is only one path between each pair of nodes.

Virtual Networks within Ethernet Networks

In an Ethernet network, it is possible to divide the network into one or more virtual networks (also referred to herein as virtual local area networks, or VLAN's). Doing so allows the network to be divided into multiple switching domains to limit the links on which packet broadcasts are performed. Virtual networks also allow nodes to be segregated so that only certain nodes are allowed to communicate with each other.

Figure 2:
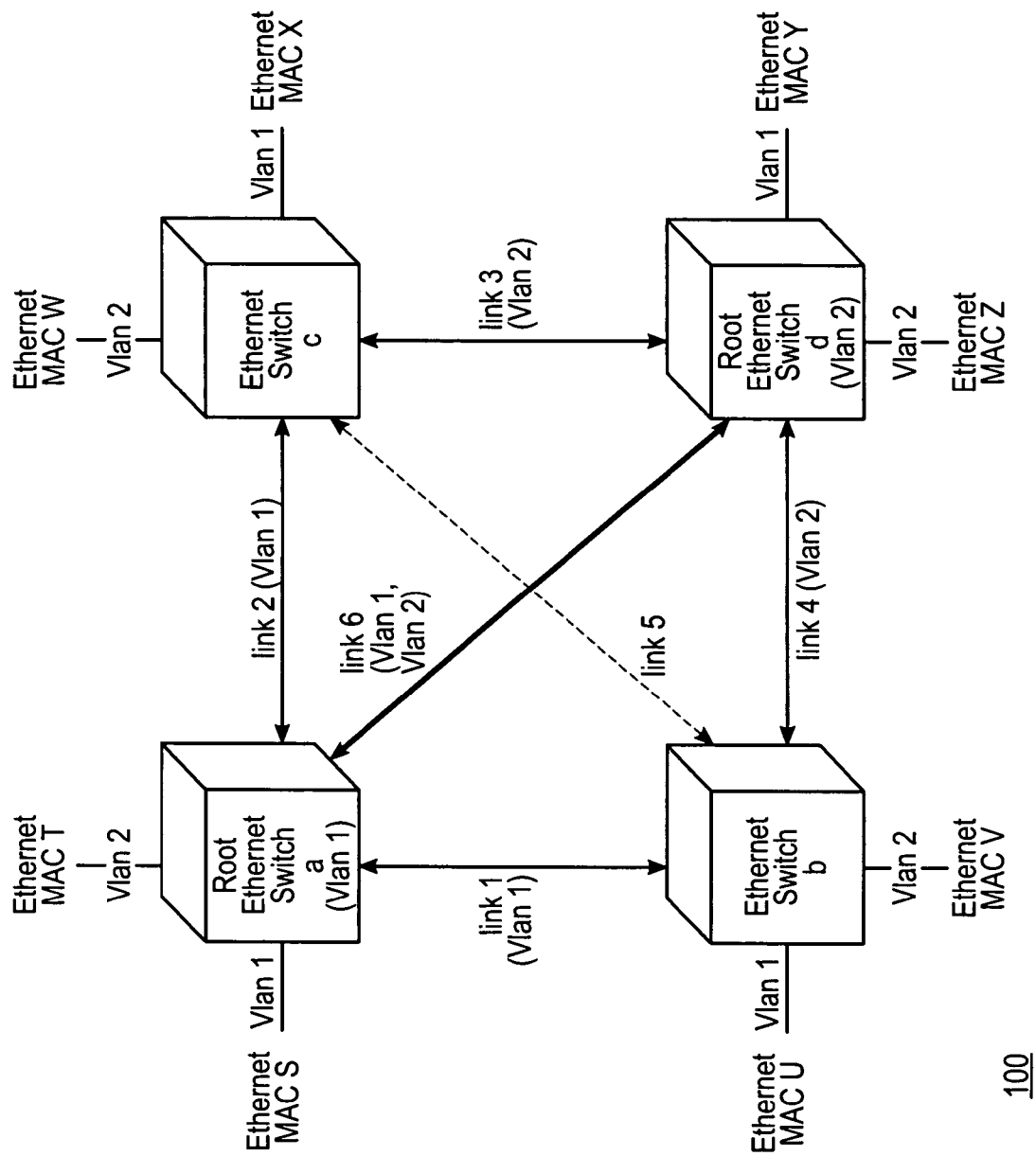
FIG. 2 shows the sample Ethernet network of FIG. 1 after it has been divided into two virtual networks.

FIG. 2 shows an example of the network 100 of FIG. 1 after it is has been divided into two VLAN's, VLAN 1 and VLAN 2. In this example, switch a is the STP root for VLAN 1 and switch d is the STP root for VLAN 2. In this example, VLAN 1 is configured in the same way as that described previously for FIG. 1, namely, links 1, 2 and 6 are placed in a forwarding state and links 3, 4 and 5 are blocked. For VLAN 2, links 2, 4, and 6 are placed in a forwarding state and links 1, 2, and 5 are blocked. Thus, in this configuration, link 5 is always blocked and link 6 carries traffic for both VLAN 1 and VLAN 2.

Each end node is associated with one of the VLAN's. Specifically, the nodes with MAC addresses S, U, X, and Y are on VLAN 1, and the nodes with MAC addresses T, V, W, and Z are on VLAN 2. Set up in this way, the nodes with MAC addresses S, U, X, and Y will be able to communicate with each other but not with the nodes with MAC addresses T, V, W, and Z. Similarly, the nodes with MAC addresses T, V, W, and Z will be able to communicate with each other but not with the nodes with MAC addresses S, U, X, and Y. In this way, the VLAN's separate the various nodes into different domains such that the nodes are treated as if they are in separate networks even though they are in the same physical network.

VLAN's also enable the broadcasting of packets to be limited to certain links. To illustrate this point, suppose that the node with MAC address W wishes to send an Ethernet packet on VLAN 2 to the node with MAC address V. To do so, it first sends the packet to switch c. Switch c looks into its forwarding table, and if it does not find MAC address V, it broadcasts the packet to its outgoing ports which support VLAN 2, in this case the port to link 3. It does not broadcast to link 2 or to the port coupled to the node with MAC address X since these ports support VLAN 1 only. Switch d then receives the packet and looks into its forwarding table for MAC address V. If it does not find MAC address V, it broadcasts the packet to its outgoing links that support VLAN 2, in this case links 4 and 6, and to the node with MAC address Z. When the packet arrives at switch b, switch b looks into its forwarding table, and if it does not find MAC address V in the forwarding table, it broadcasts the packet to its outgoing links that support VLAN 2, in this case to the node with MAC address V. In this way, the node with MAC address V receives the packet. With the use of a VLAN, the packet reaches the destination with broadcasts over a fewer number of links.

A point to note about VLAN's is that they in and of themselves are loop-free switching path, reverse path learning networks. Each VLAN provides one and only one path between each pair of nodes; thus, packet broadcast and reverse path learning can still be performed. Consequently, VLAN's implemented within an Ethernet network retain the advantages of Ethernet networks.

Multiple Switching Paths

VLAN's have primarily been used to segregate traffic within a network. It has been observed by Applicants, however, that VLAN's may also be used to provide multiple paths between node pairs. For example, if all of the nodes in FIG. 2 are associated with both VLAN 1 and VLAN 2, then various nodes would have two possible paths to various other nodes. For example, the node with MAC address Y would have two paths to the node with MAC address V. Using VLAN 1, the path would be from switch d to link 6 to switch a to link 1 to switch b. Using VLAN 2, the path would be from switch d to link 4 to switch b. Thus, by setting up multiple VLAN's, and by associating nodes with multiple VLAN's, it is possible to provide multiple paths between each pair of nodes. These multiple paths will enable load balancing to be performed, fault tolerance to be enhanced, and switching capacity to be more fully utilized. As an additional point, these benefits can be realized without losing the advantages of a loop-free switching path, reverse path learning network. As noted above, VLAN's do not violate any of the fundamentals of a loop-free switching path, reverse path learning network. Thus, by setting up multiple VLAN's, and by associating nodes with multiple VLAN's, it is possible to provide multiple paths between node pairs, even in a loop-free switching path, reverse path learning network, such as an Ethernet network.

Sample Multi-Path Network

Figure 3:
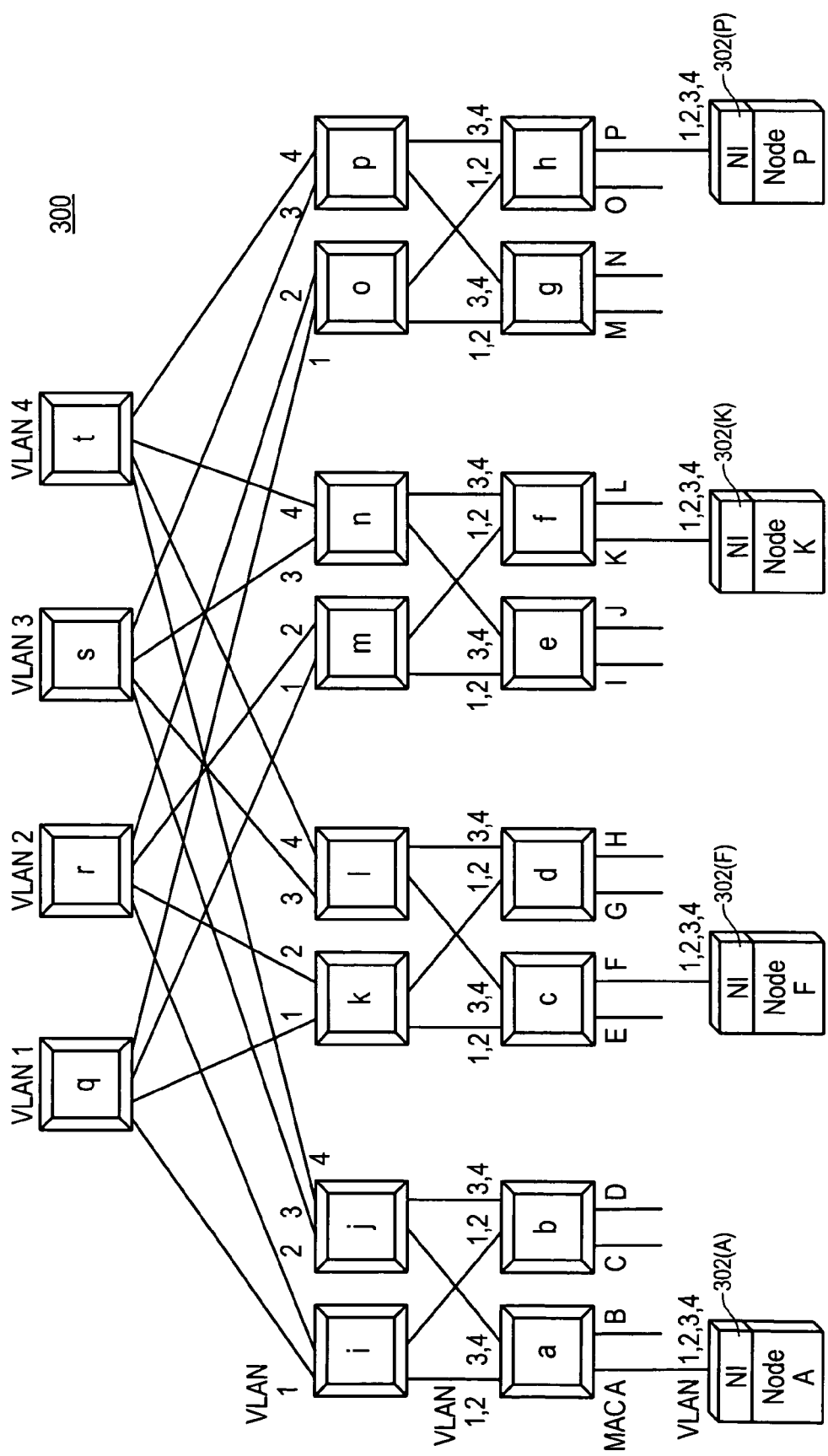
FIG. 3 shows a sample loop-free switching path, reverse path learning network in which multiple virtual networks have been established to provide multiple paths between each pair of nodes.

FIG. 3 shows an example of a loop-free switching path, reverse path learning network 300 in which multiple VLAN's have been established to provide multiple paths between each pair of nodes. Specifically, in network 300, there are four VLAN's (VLAN's 1 through 4); thus, there are four possible paths between each pair of nodes.

In FIG. 3, the components labeled with lower case letters are switches, and the components identified with capital letters are nodes. For the sake of convenience, the same capital letter is used to identify both a node and its MAC address. Thus, node A has MAC address A, node F has MAC address F, and so forth. For the sake of simplicity, only some of the nodes in the network 300 are shown. Each link has one or more numbers placed next to it. This number indicates the VLAN that is supported on that link. For example, the link between switch a and switch j has the label "3,4". This means that the link supports VLAN's 3 and 4. Given this labeling system, it can be seen that each of the links going to and from a node supports all four VLAN's. Thus, each node can use and can be reached via any of the four VLAN's.

In network 300, switch q is the root switch for VLAN 1, switch r is the root switch for VLAN 2, switch s is the root switch for VLAN 3, and switch t is the root switch for VLAN 4. Applying an STP to network 300 using each of the above switches as root switches will cause four spanning trees to be produced. Each spanning tree will represent one of the VLAN's, and each spanning tree will specify the loop-free paths between all of the nodes. The topology shown in FIG. 3 may be the result of this process. To enforce the spanning trees, the various switches may be configured, either manually or by an automated network manager (not shown), to associate each link with one or more VLAN's. For example, switches a and j may be configured to associate the link between them with VLAN's 3 and 4. By configuring the switches in this way, each switch will know which links can be used with which VLAN or VLAN's. In one embodiment, each spanning tree and hence, each VLAN, provides a different path from a source node to a destination node. For example, on VLAN 1, the path from node A to node K would be from switch a to switch i to switch q to switch m to switch f. On VLAN 4, the path from node A to node K would be from switch a to switch j to switch t to switch n to switch f. By choosing different VLAN's, packets can be sent from a source node to a destination node along different paths.

Figure 4A:
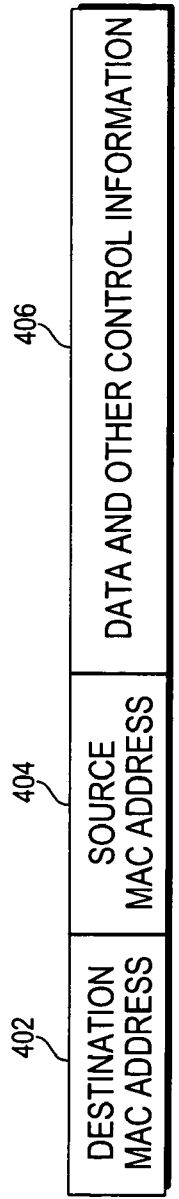
FIG. 4a shows a sample Ethernet packet before path-selection virtual network information is added.
Figure 4B:
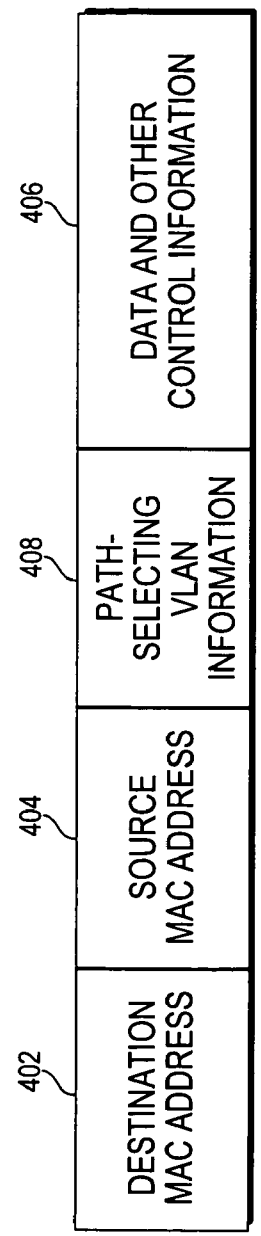
FIG. 4b shows the Ethernet packet of FIG. 4a after path-selection virtual network information has been added.

To enable an Ethernet packet to be properly switched according to VLAN's, some information is added to each packet. FIG. 4a shows a standard Ethernet packet comprising a destination MAC address 402, a source MAC address 404, and data and other control information 406. In one embodiment, to VLAN enable a packet, a set of path-selecting VLAN information 408 is inserted into the packet between the source MAC address 404 and the data and other control information 406, as shown in FIG. 4b. The VLAN information 408 may include information (e.g. a VLAN ID) indicating which VLAN is to be used to switch the packet, as well as any other information (e.g. control information) needed by the switches to switch the packet properly. The VLAN information 408 enables the switches to determine the correct VLAN, and hence, the correct path to take to switch the packet to the destination node. In one embodiment, the path-selecting VLAN information 408 is removed from the packet when the packet is received. Thus, by the time the destination node gets the packet, the VLAN information 408 will no longer be there. As a result, the destination node can remain unaware that the path-selecting VLAN information 408 was ever in the packet. This in turn enables the path-selection to be carried out without changing any networking protocols implemented by the source and destinations nodes.

Figure 4C:
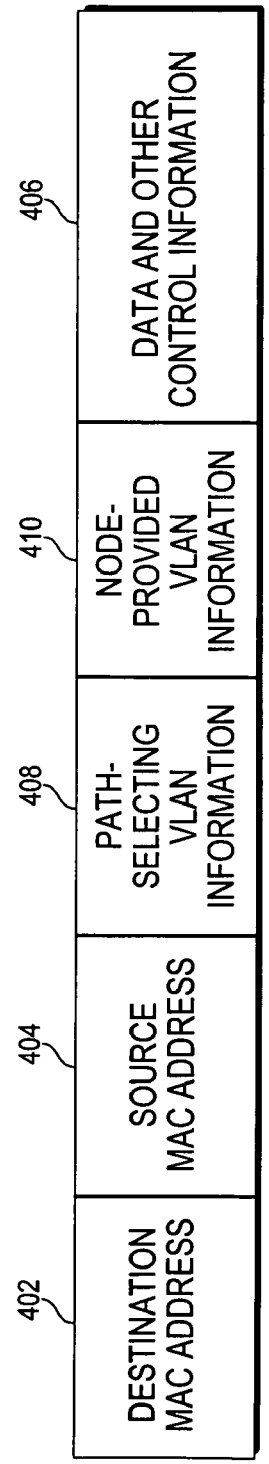
FIG. 4c shows a sample Ethernet packet that contains both path-selection virtual network information and node-provided virtual network information.

In some implementations, the source and destination nodes may already be implementing VLAN's (for example, for segregation purposes). Thus, an Ethernet packet may already contain a set of VLAN information. Even in such a case, a set of path-selecting VLAN information may still be added to the Ethernet packet. This is shown in FIG. 4c, where the path-selecting VLAN information 408 is inserted into the packet between the source MAC address 404 and the node-provided VLAN information 410. In this case, it will be the path-selecting VLAN information 408, not the node-provided VLAN information 410, that will be used by the switches to switch the packet through the network 300 to the destination node. As this example shows, path selection can be implemented even with packets that already contain node-provided VLAN information.

To show that the network 300 of FIG. 3 still behaves like a loop-free switching path, reverse path learning network, reference will now be made to an example. Suppose that node A wishes to send an Ethernet packet to Node P. Suppose further that VLAN 1 is to be used; thus, the packet is updated with information indicating VLAN 1 as the VLAN of choice. Suppose further that the switches in the path have not yet learned the MAC address/switch port association. In such a case, when the packet is sent to switch a, switch a will broadcast the packet to all of its outgoing ports on which VLAN 1 is enabled. These ports include the port attached to MAC address B and the port labeled VLAN 1,2. The port labeled 3,4 is not part of VLAN 1 and therefore would be blocked for the broadcast of this packet. The packet is sent to switch i, which in turn, broadcasts the packet onto those ports which are part of VLAN 1. In this case, these would be the link labeled 1,2 which connects switch i to switch b, and the link labeled VLAN 1, which connects switch i to switch q. Switch b broadcasts the packet to the ports attached to MAC addresses C and D but not to switch j. Switch q broadcasts the packet to switches k, m and o. Switch k broadcasts the packet to switches c and d but not to switch r since that link is only enabled for VLAN 2. Likewise, switch m broadcasts the packet to switches e and f and not to switch r, and switch o broadcasts the packet to switches g and k and not to switch r. Switch c forwards the packet to the ports connected to MAC addresses E and F, switch d forwards to ports connected to MAC addresses G and H, switch e forwards to ports connected to MAC addresses I and J, switch f forwards to ports connected to MAC addresses K and L, switch g forwards to ports connected to MAC addresses M and N, and switch h forwards to ports connected to MAC addresses O and P. Node P thus receives the packet. Note that because of the tree structure on which VLAN 1 is defined, there are no loops in the switching topology; hence, there is only one path between each pair of end nodes for which VLAN 1 is enabled. This example demonstrates how an Ethernet packet in network 300 can reach its destination without apriori knowledge of the switching path, and is consistent with how Ethernet typically performs flooding.

As each switch switches the packet, it is also carrying out reverse path learning. Thus, each switch (switches h, o, q, i, a) along the path populates its forwarding tables with an association between source MAC address A, VLAN 1, and the port on which the packet was received. That way, when node P sends an Ethernet packet destined for node A on VLAN 1, the switches will already know how to switch that packet. Namely, the packet will be forwarded from node P to switch h then to switch o over the link marked 1,2 to switch q over the link marked 1 to switch i over the link marked 1 to switch a over the link marked VLAN 1,2 to the port connected to MAC address A, which is Node A. No flooding or broadcasting is necessary. As illustrated by this example, the reverse path learning for a VLAN-based multi-path switching topology is just an extension (e.g. taking the VLAN into account) of the reverse path learning methodology carried out for non-VLAN based switching topology.

Continuing the example, assume that node P wants to send an Ethernet packet to node A, but this time over VLAN 4. Further assume that the switches have populated their forwarding tables via reverse path learning from a previous Ethernet packet sent from node A to node P over VLAN 4. The Ethernet packet with VLAN 4 and destination MAC address A will be forwarded from node P to switch h then to switch p over the link marked 3,4 to switch t over the link marked 4 to switch j over the link marked 4 to switch a over the link marked 3,4 to the port connected to node A.

With the multiple VLAN's defined between each pair of nodes, any node can send an Ethernet packet to another node using one of the four VLAN's, and hence, one of the four switching paths through the switching topology. The ability to use the four switching paths between each pair of nodes effectively increases the cross section switching capacity of the network. In the example above, there are four VLAN paths defined so there is an increase by a factor of four to the cross section switching capacity. This use of different VLAN based switching paths also serves to distribute the traffic over multiple links, thereby effectively balancing the traffic within the switching network.

Network Interface

As shown in FIG. 3, each node is coupled to the network 300 through a corresponding network interface 302. Basically, the network interface 302 interfaces the node with the network 300 to enable the node to send and receive sets of information (e.g. packets). In one embodiment, it is the network interface 302 that selects which VLAN to use to transport a set of information to a destination node. This will be discussed in greater detail in a later section.

For purposes of the present invention, a network interface 302 may take on any desired form and its functionality may be implemented in any desired manner. For example, a network interface 302 may be a physical interface (e.g. a network interface card) that is coupled to but is separate from the node. As an alternative, a network interface 302 may be a physical component that is part of the node (e.g. integrated into the node's motherboard, integrated into the node's processor or processors, etc.). As a further alternative, a network interface 302 may be a logical component (e.g. a computer program) that resides and runs on the node. These and other embodiments are within the scope of the present invention. In any embodiment, the functionality of the network interface 302 may be realized using hardware (e.g. hardware logic components, ASIC's, etc.), software (e.g. having one or more processors execute one or more sets of instructions), or a combination of both.

For purposes of the present invention, a node may be any component that communicates on the network. In one embodiment, a node comprises one or more processors, and executes an operating system and one or more applications. In such a node, the applications and operating system may perform some networking functions, such as preparing sets of information (e.g. packets) for sending into the network, implementing network protocols, determining destinations nodes, etc. However, in one embodiment, the operating system and the applications do not participate in the selection of the VLAN, and hence, the selection of the path to be taken to transport a set of information to a destination node. In fact, the operating system and applications do not even need to be aware of the multiple VLAN's. Rather, in one embodiment, selection of the VLAN to use in transporting a set of information is the responsibility of the network interface 302. By delegating this responsibility to the network interface 302, it is possible to shield the operating system and applications from the complexities of the network. As a result, it is possible to implement the methodology of the present invention without modifying any existing operating systems and applications.

Figure 5:
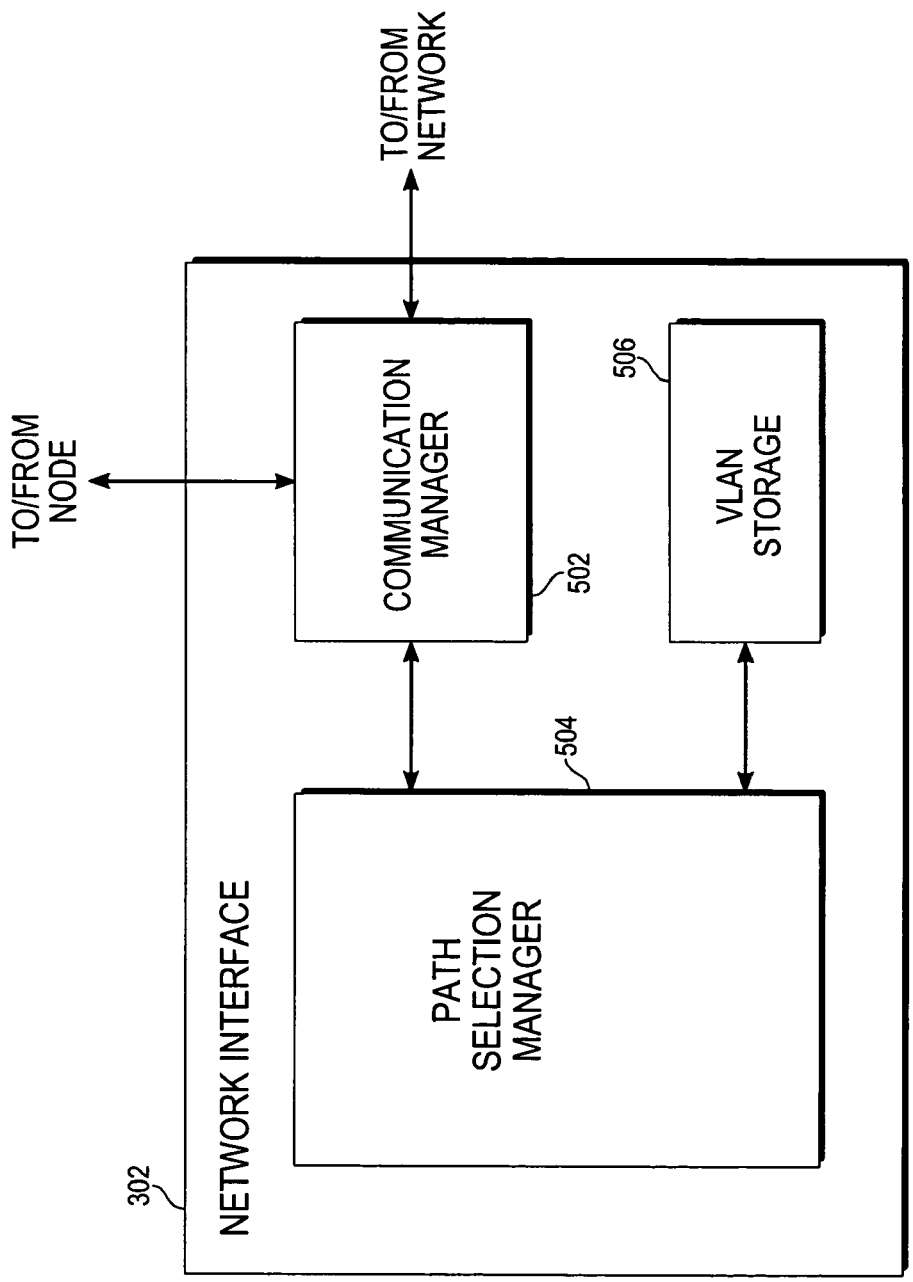
FIG. 5 is a functional block diagram of a network interface, in accordance with one embodiment of the present invention.

FIG. 5 shows a functional block diagram of a network interface 302 in accordance with one embodiment of the present invention. As shown, the network interface 302 comprises a communication manager 502, a path selection manager 504, and a VLAN storage 506. Generally, the communication manager 502 is responsible for sending and receiving communications to and from its corresponding node and the network. The path selection manager 504 is responsible for selecting a VLAN, and hence, a path for outgoing sets of information. The VLAN storage 506 is used to store information pertaining to the one or more VLAN's that can be used to transport a set of information from the corresponding node to a destination node. The functions performed by these components will be elaborated upon in the following discussion.

Sample Network Interface Operation

Figure 6:
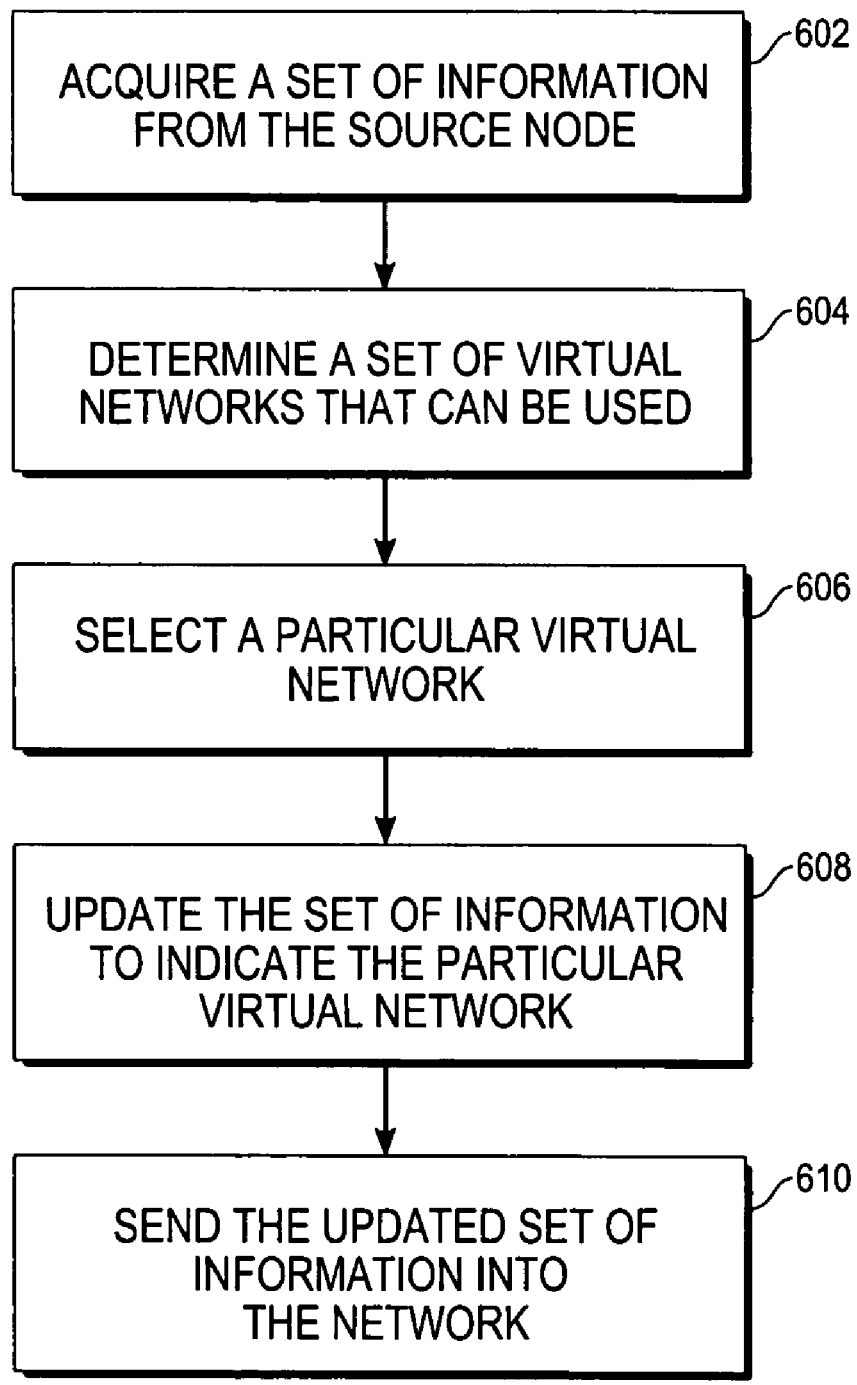
FIG. 6 is a flow diagram illustrating the operation of a network interface in accordance with one embodiment of the present invention.

FIG. 6 shows a flow diagram which illustrates the manner in which a network interface 302 operates in accordance with one embodiment of the present invention. Before the operations shown in FIG. 6 are performed, a network, such as network 300 in FIG. 3, is first configured. The network 300 may be configured by a network administrator by selecting the four switches q, r, s, and t as the root switches for their respective VLAN's, and then running an STP for each root switch. This will produce a spanning tree for each VLAN, which defines the paths between all of the node pairs in the VLAN. After the four spanning trees are derived, the switches are configured such that they recognize which links support which VLAN's, in accordance with the derived spanning trees. Once that is done, each of the network interfaces 302 is informed of the VLAN's that it can use to transport information from a source node to a destination node. In network 300, the usable VLAN's are VLAN's 1, 2, 3, and 4. This set of VLAN's is stored by each network interface 302 in its VLAN storage 506 (FIG. 5). With the network 300 thus configured, the network interfaces 302 are ready to facilitate communication by their respective nodes. In the following discussion, it will be assumed for the sake of example that node A is the source node, node P is the destination node, and network interface 302(A) is the interface whose operation is being described.

To send a set of information (e.g. an Ethernet packet) from node A to node P, network interface 302(A), and more specifically, the communication manager 502 on network interface 302(A), acquires (block 602 of FIG. 6) a set of information from node A. Network interface 302(A) may acquire this set of information in any number of ways. For example, node A may simply provide the set of information to network interface 302(A). Node A may also provide a reference or a pointer to the set of information, which the network interface 302(A) would use to access the set of information. Network interface 302(A) may also acquire the set of information in other ways.

In one embodiment, the set of information specifies an address for the destination node or comprises information from which the address of the destination node may be derived. For example, the set of information may actually include the address for node P. Alternatively, the set of information may include some other information (such as a memory location) from which the address for node P can be derived. In such a case, the communication manager 502 on network interface 302(A) derives the address for node P. As a further alternative, the set of information may comprise other information that can be used to derive the address of node P.

Network interface 302(A), and more specifically, the path selection manager 504 on network interface 302(A), determines (block 604) a set of virtual networks that can be used to transport the set of information to node P. As discussed above, at the time the network 300 is configured, each network interface 302 is informed of and stores the set of VLAN's (in its VLAN storage 506) that it can use to transport sets of information. Thus, network interface 302(A) accesses and consults this information, and determines that, in the current example, it can use VLAN's 1, 2, 3, and 4.

Thereafter, network interface 302(A), and more specifically, the path selection manager 504 on network interace 302(A), selects (block 606) one of the VLAN's to use to transport the set of information. For the sake of example, it will be assumed VLAN 1 is selected. In one embodiment, this selection is made after the address of the destination node is specified or derived. Also, in one embodiment, this selection is made in a manner that tends to balance the traffic load across the multiple VLAN's. For example, the network interface 302(A) may select the VLAN randomly (if the selection process is truly random, this should spread traffic across the various VLAN's relatively evenly). The network interface 302(A) may also select the VLAN in a round-robin fashion. Furthermore, the network interface 302(A) may select the VLAN based upon current traffic conditions. For example, the network interface 302(A) may select the VLAN with the path that is currently experiencing the lowest traffic load, or the VLAN with the path that currently has the most available capacity for carrying traffic. Information on current traffic conditions may be provided to the path selection manager 504 of network interface 302(A) by a central traffic monitoring component (not shown) or may be derived based upon information gathered by the path selection manager 504 of network interface 302(A). Based upon this information, network interface 302(A) can select the VLAN in such a manner as to balance the traffic load across the multiple paths. Load balancing is thus achieved.

After the VLAN (VLAN 1 in the current example) is selected, the network interface 302(A), and more specifically, the path selection manager 504 of network interface 302(A), updates (block 608) the set of information to include information indicating the particular VLAN that was selected. In one embodiment, this may be done as shown in FIGS. 4b and 4c, wherein the path selecting VLAN information 408 is inserted into the set of information. After the set of information is updated, it is sent (block 610) by the network interface 302(A), and more specifically, by the communication manager 502 of network interface 302(A), into the network 300. The switches in the network 300 then use the address and VLAN information in the set of information to switch the set of information to node P along VLAN 1.

On the receiving end, the network interface 302(P), and more specifically, the communication manager 502 on network interface 302(P), receives the set of information, and removes the path-selecting VLAN information 408 therefrom. The network interface 302(P) then passes the set of information to node P for processing. The set of information is thus delivered from node A to node P.

In one embodiment, the network interface 302(A) processes every set of information destined for node P in this way. Thus, network interface 302(A) may acquire another set of information from node A that is destined for node P. For this set of information, network interface 302(A) would perform the same operations as that shown in FIG. 5. However, the network interface 302(A) may select a different VLAN (VLAN 2, for example) for this set of information. In general, the network interface 302(A) may acquire a series of information sets from node A that are destined for node P, and may select different VLAN's for different information sets. By doing so, the network interface 302(A) distributes the traffic across the multiple VLAN's, and hence, the multiple paths. If each network interface 302 does this, then load balancing can be achieved throughout the network 300. In this manner, load balancing is implemented on a dynamic, packet by packet basis.

At this point, it should be noted that although the invention has been described with reference to one or more specific embodiments, it should not be construed to be so limited. Various modifications may be made by those of ordinary skill in the art with the benefit of this disclosure without departing from the spirit of the invention. For example, the network 300 shown in FIG. 3 is just a sample network. This switching topology can be extended to include more switches, to switches with fewer or more ports, to fewer or more hierarchical levels of switches, to fewer or more VLAN's and VLAN paths, etc. These and other modifications and extensions are possible. Thus, the invention should not be limited by the specific embodiments used to illustrate it but only by the scope of the issued claims and the equivalents thereof.

What is claimed is:

1. In a system comprising a network, a destination node coupled to the network, a source node, and a network interface for interfacing the source node with the network, wherein the network is a loop-free, reverse-path-learning network, and wherein the network is divided into a plurality of virtual networks, a method performed by the network interface, comprising:

acquiring from the source node a set of information that is destined for the destination node, wherein the set of information specifies an address for the destination node or comprises information from which the address can be derived;

determining a set of virtual networks that can be used to transport the set of information from the source node to the destination node, wherein the set of virtual networks comprises multiple virtual networks and is at least a subset of the plurality of virtual networks, and wherein each virtual network in the set of virtual networks provides a different path through the network from the source node to the destination node such that there are multiple selectable paths from the source node to the destination node;

selecting, after the address of the destination node is specified or derived, a particular virtual network from the set of virtual networks, thereby, effectively selecting a particular path from the source node to the destination node;

updating the set of information to include information indicating the particular virtual network that has been selected to derive an updated set of information; and sending the updated set of information into the network to allow the network to transport the updated set of information to the destination node along the particular path;

wherein the source node executes an operating system, wherein the network interface selects the particular virtual network without any participation from the operating system, and wherein the operating system is unaware of the set of virtual networks.

2. The method of claim 1, wherein all of the virtual networks in the set of virtual networks are concurrently active such that any of the virtual networks in the set of virtual networks can be selected.

3. The method of claim 2, wherein selecting the particular virtual network comprises:

selecting, in a random manner, one of the virtual networks in the set of virtual networks to be the particular virtual network.

4. The method of claim 2, wherein selecting the particular virtual network comprises:

selecting, in a round-robin fashion, one of the virtual networks in the set of virtual networks to be the particular virtual network.

5. The method of claim 2, wherein selecting the particular virtual network comprises:

determining which of the multiple selectable paths is currently experiencing a lowest traffic load; and selecting the virtual network associated with that path as the particular virtual network.

6. The method of claim 2, wherein selecting the particular virtual network comprises:

determining which of the multiple selectable paths currently has a most available capacity for carrying traffic; and selecting the virtual network associated with that path as the particular virtual network.

7. The method of claim 2, wherein selecting the particular virtual network comprises:

determining current traffic conditions for at least some of the multiple selectable paths; and selecting one of the virtual networks in the set of virtual networks to be the particular virtual network based upon the current traffic conditions.

8. The method of claim 1, further comprising:

acquiring from the source node a second set of information that is destined for the destination node, wherein the second set of information specifies the address for the destination node or comprises information from which the address can be derived;

determining the set of virtual networks that can be used to transport the second set of information from the source node to the destination node;

selecting, after the address of the destination node is specified, another virtual network from the set of virtual networks, thereby, effectively selecting another path from the source node to the destination node;

updating the second set of information to include information indicating the other virtual network that has been selected to derive a second updated set of information; and sending the second updated set of information into the network to allow the network to transport the second updated set of information to the destination node along the other path.

9. The method of claim 1, wherein the network interface performs the method on every set of information acquired from the source node that is destined for the destination node.

10. In a system comprising a network, a destination node coupled to the network, a source node, and a network interface for interfacing the source node with the network, wherein the network is a loop-free, reverse-path-learning network, and wherein the network is divided into a plurality of virtual networks, a method performed by the network interface, comprising:
   acquiring from the source node a series of information sets that are destined for the destination node, wherein each information set in the series of information sets specifies an address for the destination node or comprises information from which the address can be derived;
   determining a set of virtual networks that can be used to transport the series of information sets from the source node to the destination node, wherein the set of virtual networks comprises multiple virtual networks and is at least a subset of the plurality of virtual networks, and wherein each virtual network in the set of virtual networks provides a different path through the network from the source node to the destination node such that there are multiple selectable paths from the source node to the destination node;
   selecting, for each information set in the series of information sets after the address of the destination node is specified or derived, a particular virtual network from the set of virtual networks that is to be used to transport that information set from the source node to the destination node, wherein different particular virtual networks are selected for different information sets, where possible, so that the information sets in the series of information sets are distributed across the virtual networks in the set of virtual networks, thereby, load balancing across the virtual networks in the set of virtual networks;
   updating each information set in the series of information sets to include information indicating which particular virtual network has been selected for that information set to derive a series of updated information sets; and
   sending the series of updated information sets into the network to allow the network to transport the series of updated information sets to the destination node via the set of virtual networks;
   wherein the source node executes an operating system, wherein the network interface selects each particular virtual network without any participation from the operating system, and wherein the operating system is unaware of the set of virtual networks.

11. In a system comprising a network, a destination node coupled to the network, and a source node, wherein the network is a loop-free, reverse-path-learning network, and wherein the network is divided into a plurality of virtual networks, a network interface for interfacing the source node with the network, comprising:
   means for acquiring from the source node a set of information that is destined for the destination node, wherein the set of information specifies an address for the destination node or comprises information from which the address can be derived;
   means for determining a set of virtual networks that can be used to transport the set of information from the source node to the destination node, wherein the set of virtual networks comprises multiple virtual networks and is at least a subset of the plurality of virtual networks, and wherein each virtual network in the set of virtual networks provides a different path through the network from the source node to the destination node such that there are multiple selectable paths from the source node to the destination node;
   means for selecting, after the address of the destination node is specified or derived, a particular virtual network from the set of virtual networks, thereby, effectively selecting a particular path from the source node to the destination node;
   means for updating the set of information to include information indicating the particular virtual network that has been selected to derive an updated set of information; and
   means for sending the updated set of information into the network to allow the network to transport the updated set of information to the destination node along the particular path;
   wherein the source node executes an operating system, wherein the network interface selects the particular virtual network without any participation from the operating system, and wherein the operating system is unaware of the set of virtual networks.

12. The network interface of claim 11, wherein all of the virtual networks in the set of virtual networks are concurrently active such that any of the virtual networks in the set of virtual networks can be selected.

13. The network interface of claim 12, wherein the selecting means comprises:
   means for selecting, in a random manner, one of the virtual networks in the set of virtual networks to be the particular virtual network.

14. The network interface of claim 12, wherein the selecting means comprises:
   means for selecting, in a round-robin fashion, one of the virtual networks in the set of virtual networks to be the particular virtual network.

15. The network interface of claim 12, wherein the selecting means comprises:
   means for determining which of the multiple selectable paths is currently experiencing a lowest traffic load; and
   means for selecting the virtual network associated with that path as the particular virtual network.

16. The network interface of claim 12, wherein the selecting means comprises:
   means for determining which of the multiple selectable paths currently has a most available capacity for carrying traffic; and
   means for selecting the virtual network associated with that path as the particular virtual network.

17. The network interface of claim 12, wherein the selecting means comprises:
   means for determining current traffic conditions for at least some of the multiple selectable paths; and
   means for selecting one of the virtual networks in the set of virtual networks to be the particular virtual network based upon the current traffic conditions.

18. The network interface of claim 11, further comprising:
   means for acquiring from the source node a second set of information that is destined for the destination node, wherein the second set of information specifies the address for the destination node or comprises information from which the address can be derived;
   means for determining the set of virtual networks that can be used to transport the second set of information from the source node to the destination node;
   means for selecting, after the address of the destination node is specified or derived, another virtual network from the set of virtual networks, thereby, effectively selecting another path from the source node to the destination node;

means for updating the second set of information to include information indicating the other virtual network that has been selected to derive a second updated set of information; and means for sending the second updated set of information into the network to allow the network to transport the second updated set of information to the destination node along the other path.

19. The network interface of claim 11, wherein the acquiring means, determining means, selecting means, updating means, and sending means process every set of information acquired from the source node that is destined for the destination node.

20. In a system comprising a network, a destination node coupled to the network, and a source node, wherein the network is a loop-free, reverse-path-learning network, and wherein the network is divided into a plurality of virtual networks, a network interface for interfacing the source node with the network, comprising:

means for acquiring from the source node a series of information sets that are destined for the destination node, wherein each information set in the series of information sets specifies an address for the destination node or comprises information from which the address can be derived;

means for determining a set of virtual networks that can be used to transport the series of information sets from the source node to the destination node, wherein the set of virtual networks comprises multiple virtual networks and is at least a subset of the plurality of virtual networks, and wherein each virtual network in the set of virtual networks provides a different path through the network from the source node to the destination node such that there are multiple selectable paths from the source node to the destination node;

means for selecting, for each information set in the series of information sets after the address of the destination node is specified or derived, a particular virtual network from the set of virtual networks that is to be used to transport that information set from the source node to the destination node, wherein different particular virtual networks are selected for different information sets, where possible, so that the information sets in the series of information sets are distributed across the virtual networks in the set of virtual networks, thereby, load balancing across the virtual networks in the set of virtual networks;

means for updating each information set in the series of information sets to include information indicating which particular virtual network has been selected for that information set to derive a series of updated information sets; and means for sending the series of updated information sets into the network to allow the network to transport the series of updated information sets to the destination node via the set of virtual networks;

wherein the source node executes an operating system, wherein the network interface selects each particular virtual network without any participation from the operating system, and wherein the operating system is unaware of the set of virtual networks.

21. A system, comprising:

a loop-free, reverse-path-learning network that is divided into a plurality of virtual networks;

a destination node coupled to the network;

a source node; and a network interface for interfacing the source node with the network, wherein the network interface comprises:

means for acquiring from the source node a set of information that is destined for the destination node, wherein the set of information specifies an address for the destination node or comprises information from which the address can be derived;

means for determining a set of virtual networks that can be used to transport the set of information from the source node to the destination node, wherein the set of virtual networks comprises multiple virtual networks and is at least a subset of the plurality of virtual networks, and wherein each virtual network in the set of virtual networks provides a different path through the network from the source node to the destination node such that there are multiple selectable paths from the source node to the destination node;

means for selecting, after the address of the destination node is specified or derived, a particular virtual network from the set of virtual networks, thereby, effectively selecting a particular path from the source node to the destination node;

means for updating the set of information to include information indicating the particular virtual network that has been selected to derive an updated set of information; and means for sending the updated set of information into the network to allow the network to transport the updated set of information to the destination node along the particular path;

wherein the source node executes an operating system, wherein the network interface selects the particular virtual network without any participation from the operating system, and wherein the operating system is unaware of the set of virtual networks.

22. The system of claim 21, wherein all of the virtual networks in the set of virtual networks are concurrently active such that any of the virtual networks in the set of virtual networks can be selected.

23. The system of claim 22, wherein the selecting means comprises:

means for selecting, in a random manner, one of the virtual networks in the set of virtual networks to be the particular virtual network.

24. The system of claim 22, wherein the selecting means comprises:

means for selecting, in a round-robin fashion, one of the virtual networks in the set of virtual networks to be the particular virtual network.

25. The system of claim 22, wherein the selecting means comprises:

means for determining which of the multiple selectable paths is currently experiencing a lowest traffic load; and means for selecting the virtual network associated with that path as the particular virtual network.

26. The system of claim 22, wherein the selecting means comprises:

means for determining which of the multiple selectable paths currently has a most available capacity for carrying traffic; and means for selecting the virtual network associated with that path as the particular virtual network.

27. The system of claim 22, wherein the selecting means comprises:

means for determining current traffic conditions for at least some of the multiple selectable paths; and means for selecting one of the virtual networks in the set of virtual networks to be the particular virtual network based upon the current traffic conditions.

28. The system of claim 21, wherein the network interface further comprises:

means for acquiring from the source node a second set of information that is destined for the destination node, wherein the second set of information specifies the address for the destination node or comprises information from which the address can be derived;

means for determining the set of virtual networks that can be used to transport the second set of information from the source node to the destination node;

means for selecting, after the address of the destination node is specified or derived, another virtual network from the set of virtual networks, thereby, effectively selecting another path from the source node to the destination node;

means for updating the second set of information to include information indicating the other virtual network that has been selected to derive a second updated set of information; and means for sending the second updated set of information into the network to allow the network to transport the second updated set of information to the destination node along the other path.

29. The system of claim 21, wherein the acquiring means, determining means, selecting means, updating means, and sending means process every set of information acquired from the source node that is destined for the destination node.

30. A system, comprising:

a loop-free, reverse-path-learning network that is divided into a plurality of virtual networks;

a destination node coupled to the network;

a source node; and a network interface for interfacing the source node with the network, wherein the network interface comprises:

means for acquiring from the source node a series of information sets that are destined for the destination node, wherein each information set in the series of information sets specifies an address for the destination node or comprises information from which the address can be derived;

means for determining a set of virtual networks that can be used to transport the series of information sets from the source node to the destination node, wherein the set of virtual networks comprises multiple virtual networks and is at least a subset of the plurality of virtual networks, and wherein each virtual network in the set of virtual networks provides a different path through the network from the source node to the destination node such that there are multiple selectable paths from the source node to the destination node;

means for selecting, for each information set in the series of information sets after the address of the destination node is specified or derived, a particular virtual network from the set of virtual networks that is to be used to transport that information set from the source node to the destination node, wherein different particular virtual networks are selected for different information sets, where possible, so that the information sets in the series of information sets are distributed across the virtual networks in the set of virtual networks, thereby, load balancing across the virtual networks in the set of virtual networks;

means for updating each information set in the series of information sets to include information indicating which particular virtual network has been selected for that information set to derive a series of updated information sets; and means for sending the series of updated information sets into the network to allow the network to transport the series of updated information sets to the destination node via the set of virtual networks;

wherein the source node executes an operating system, wherein the network interface selects each particular virtual network without any participation from the operating system, and wherein the operating system is unaware of the set of virtual networks.

31. In a system comprising a network, a destination node coupled to the network, a source node, and a network interface for interfacing the source node with the network, wherein the network is a loop-free, reverse-path-learning network, and wherein the network is divided into a plurality of virtual networks, a method performed by the network interface, comprising:

acquiring from the source node a set of information that is destined for the destination node, wherein the set of information specifies an address for the destination node or comprises information from which the address can be derived;

determining a set of virtual networks that can be used to transport the set of information from the source node to the destination node, wherein the set of virtual networks comprises multiple virtual networks and is at least a subset of the plurality of virtual networks, and wherein each virtual network in the set of virtual networks provides a different path through the network from the source node to the destination node such that there are multiple selectable paths from the source node to the destination node;

selecting, after the address of the destination node is specified or derived, a particular virtual network from the set of virtual networks, thereby, effectively selecting a particular path from the source node to the destination node;

updating the set of information to include information indicating the particular virtual network that has been selected to derive an updated set of information; and sending the updated set of information into the network to allow the network to transport the updated set of information to the destination node along the particular path;

wherein the source node executes an application, wherein the network interface selects the particular virtual network without any participation from the application, and wherein the application is unaware of the set of virtual networks.

32. In a system comprising a network, a destination node coupled to the network, and a source node, wherein the network is a loop-free, reverse-path-learning network, and wherein the network is divided into a plurality of virtual networks, a network interface for interfacing the source node with the network, comprising:

means for acquiring from the source node a set of information that is destined for the destination node, wherein the set of information specifies an address for the destination node or comprises information from which the address can be derived;

means for determining a set of virtual networks that can be used to transport the set of information from the source node to the destination node, wherein the set of virtual networks comprises multiple virtual networks and is at least a subset of the plurality of virtual networks, and wherein each virtual network in the set of virtual networks provides a different path through the network from the source node to the destination node such that there are multiple selectable paths from the source node to the destination node;

means for selecting, after the address of the destination node is specified or derived, a particular virtual network from the set of virtual networks, thereby, effectively selecting a particular path from the source node to the destination node;

means for updating the set of information to include information indicating the particular virtual network that has been selected to derive an updated set of information; and means for sending the updated set of information into the network to allow the network to transport the updated set of information to the destination node along the particular path;

wherein the source node executes an application, wherein the network interface selects the particular virtual network without any participation from the application, and wherein the application is unaware of the set of virtual networks.

33. A system, comprising:

a loop-free, reverse-path-learning network that is divided into a plurality of virtual networks;

a destination node coupled to the network;

a source node; and a network interface for interfacing the source node with the network, wherein the network interface comprises:

means for acquiring from the source node a set of information that is destined for the destination node, wherein the set of information specifies an address for the destination node or comprises information from which the address can be derived;

means for determining a set of virtual networks that can be used to transport the set of information from the source node to the destination node, wherein the set of virtual networks comprises multiple virtual networks and is at least a subset of the plurality of virtual networks, and wherein each virtual network in the set of virtual networks provides a different path through the network from the source node to the destination node such that there are multiple selectable paths from the source node to the destination node;

means for selecting, after the address of the destination node is specified or derived, a particular virtual network from the set of virtual networks, thereby, effectively selecting a particular path from the source node to the destination node;

means for updating the set of information to include information indicating the particular virtual network that has been selected to derive an updated set of information; and means for sending the updated set of information into the network to allow the network to transport the updated set of information to the destination node along the particular path;

wherein the source node executes an application, wherein the network interface selects the particular virtual network without any participation from the application, and wherein the application is unaware of the set of virtual networks.

34. The method of claim 1, wherein each virtual network in the set of virtual networks is a loop-free, reverse-path-learning network.

35. The network interface of claim 11, wherein each virtual network in the set of virtual networks is a loop-free, reverse-path-learning network.

36. The system of claim 21, wherein each virtual network in the set of virtual networks is a loop-free, reverse-path-learning network.

37. In a system comprising a network, a destination node coupled to the network, and a source node, wherein the network is a loop-free, reverse-path-learning network, and wherein the network is divided into a plurality of virtual networks, a network interface for interfacing the source node with the network, comprising:

a communication mechanism coupled to the source node and the network;

a storage for storing virtual network information; and a path selection mechanism coupled to the communication mechanism and the storage;

wherein the communication mechanism, the storage, and the path selection mechanism are configured to cooperate with each other to:

acquire from the source node a set of information that is destined for the destination node, wherein the set of information specifies an address for the destination node or comprises information from which the address can be derived;

determine, from the virtual network information stored in the storage, a set of virtual networks that can be used to transport the set of information from the source node to the destination node, wherein the set of virtual networks comprises multiple virtual networks and is at least a subset of the plurality of virtual networks, and wherein each virtual network in the set of virtual networks provides a different path through the network from the source node to the destination node such that there are multiple selectable paths from the source node to the destination node;

select, after the address of the destination node is specified or derived, a particular virtual network from the set of virtual networks, thereby, effectively selecting a particular path from the source node to the destination node;

update the set of information to include information indicating the particular virtual network that has been selected to derive an updated set of information; and send the updated set of information into the network to allow the network to transport the updated set of information to the destination node along the particular path;

wherein the source node executes an operating system, wherein the network interface selects the particular virtual network without any participation from the operating system, and wherein the operating system is unaware of the set of virtual networks.

38. The network interface of claim 37, wherein all of the virtual networks in the set of virtual networks are concurrently active such that any of the virtual networks in the set of virtual networks can be selected.

39. The network interface of claim 38, wherein the particular virtual network is selected from the set of virtual networks in a random manner.

40. The network interface of claim 38, wherein the particular virtual network is selected from the set of virtual networks in a round-robin fashion.

41. The network interface of claim 38, wherein the particular virtual network is selected by determining which of the multiple selectable paths is currently experiencing a lowest traffic load, and selecting the virtual network associated with that path as the particular virtual network.

42. The network interface of claim 38, wherein the particular virtual network is selected by determining which of the multiple selectable paths currently has a most available capacity for carrying traffic, and selecting the virtual network associated with that path as the particular virtual network.

43. The network interface of claim 38, wherein the particular virtual network is selected by determining current traffic conditions for at least some of the multiple selectable paths, and selecting one of the virtual networks in the set of virtual networks to be the particular virtual network based upon the current traffic conditions.

44. The network interface of claim 37, wherein the communication mechanism, the storage, and the path selection mechanism are further configured to cooperate with each other to:
   acquire from the source node a second set of information that is destined for the destination node, wherein the second set of information specifies the address for the destination node or comprises information from which the address can be derived;
   determine the set of virtual networks that can be used to transport the second set of information from the source node to the destination node;
   select, after the address of the destination node is specified or derived, another virtual network from the set of virtual networks, thereby, effectively selecting another path from the source node to the destination node;
   update the second set of information to include information indicating the other virtual network that has been selected to derive a second updated set of information; and
   send the second updated set of information into the network to allow the network to transport the second updated set of information to the destination node along the other path.

45. The network interface of claim 37, wherein the source node executes an application, wherein the network interface selects the particular virtual network without any participation from the application, and wherein the application is unaware of the set of virtual networks.

46. The network interface of claim 37, wherein each virtual network in the set of virtual networks is a loop-free, reverse-path-learning network.

47. In a system comprising a network, a destination node coupled to the network, and a source node, wherein the network is a loop-free, reverse-path-learning network, and wherein the network is divided into a plurality of virtual networks, a network interface for interfacing the source node with the network, comprising:

a communication mechanism coupled to the source node and the network;

a storage for storing virtual network information; and a path selection mechanism coupled to the communication mechanism and the storage;

wherein the communication mechanism, the storage, and the path selection mechanism are configured to cooperate with each other to:

acquire from the source node a series of information sets that are destined for the destination node, wherein each information set in the series of information sets specifies an address for the destination node or comprises information from which the address can be derived;

determine, from the virtual network information stored in the storage, a set of virtual networks that can be used to transport the series of information sets from the source node to the destination node, wherein the set of virtual networks comprises multiple virtual networks and is at least a subset of the plurality of virtual networks, and wherein each virtual network in the set of virtual networks provides a different path through the network from the source node to the destination node such that there are multiple selectable paths from the source node to the destination node;

select, for each information set in the series of information sets after the address of the destination node is specified or derived, a particular virtual network from the set of virtual networks that is to be used to transport that information set from the source node to the destination node, wherein different particular virtual networks are selected for different information sets, where possible, so that the information sets in the series of information sets are distributed across the virtual networks in the set of virtual networks, thereby, load balancing across the virtual networks in the set of virtual networks;

update each information set in the series of information sets to include information indicating which particular virtual network has been selected for that information set to derive a series of updated information sets; and send the series of updated information sets into the network to allow the network to transport the series of updated information sets to the destination node via the set of virtual networks;

wherein the source node executes an operating system, wherein the network interface selects each particular virtual network without any participation from the operating system, and wherein the operating system is unaware of the set of virtual networks.

* * * * *